2,716,136

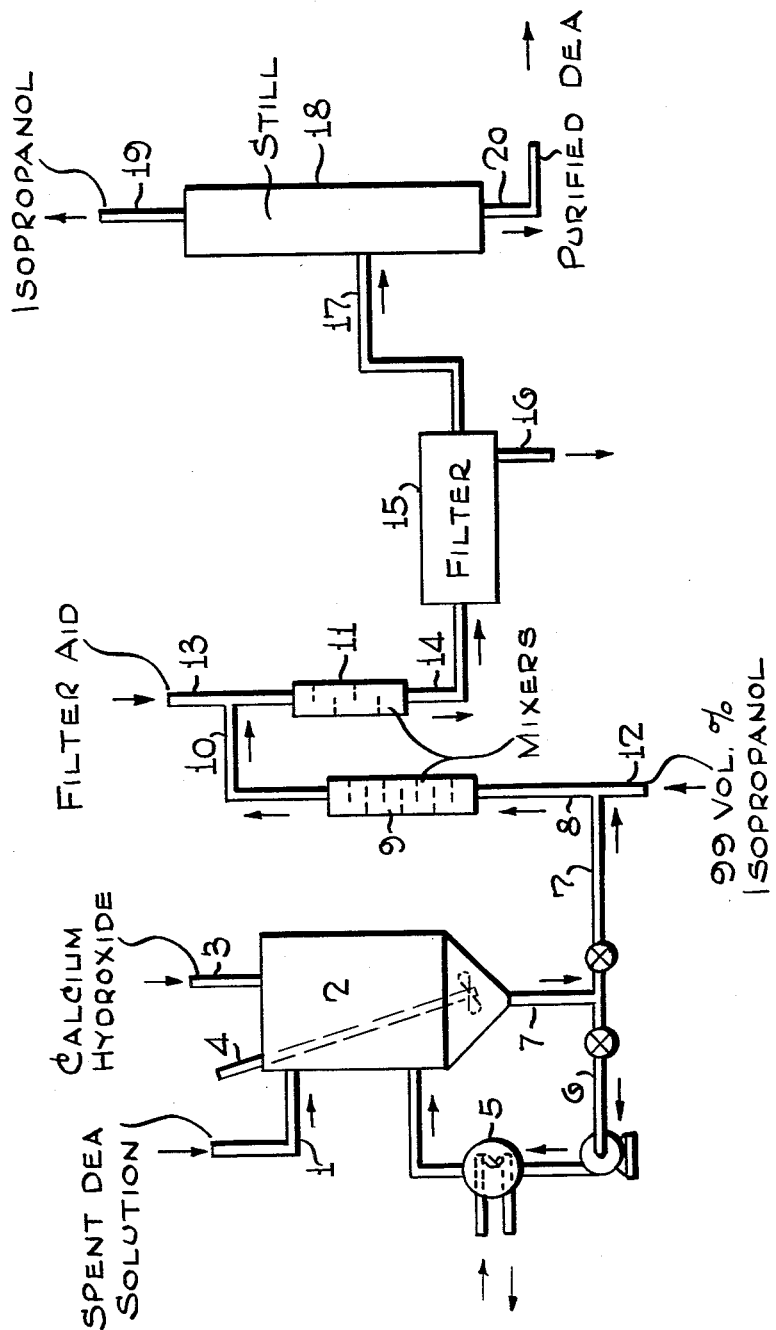

PURIFICATION OF ETHANOLAMINES

Henry C. Paulsen, Elizabeth, N. J., assignor to Esso Research and Engineering Company, a corporation of Delaware Application September 10, 1952, Serial No. 308,789

3 Claims. (Cl. 260—584)

This invention relates to a process for the purification of ethanolamines. More particularly, it relates to a process for regenerating ethanolamines which have become undesirably combined when in aqueous solutions.

Ethanolamine aqueous solutions, and especially diethanolamine aqueous solutions, are commonly used as absorbents for removing hydrogen sulfide from certain gas streams. These streams usually contain hydrogen sulfide along with organic impurities, some of which are acidic in nature. The hydrogen sulfide and other impurities combine with the diethanolamine, which makes it inactive and unsuitable for further use. Hydrogen sulfide can be readily removed by steam stripping and the diethanolamine regenerated. The other impurities cannot be removed by that process, and hence the diethanolamine combined with them is not regenerated. Consequently, when the combined diethanolamine content of the solution becomes 12 to 20 weight per cent and its viscosity exceeds about 40 SSU at 100° F., it is discarded and replaced with a fresh solution.

The present invention provides an improved method for the purification and regeneration of ethanolamine present in a combined form in aqueous solutions from which $H_2S$ has already been removed. The method comprises in combination treating the aqueous ethanolamine with an alkaline earth metal hydroxide, precipitation of the alkaline earth organic salts with a water soluble lower alcohol to regenerate the ethanolamine, and distilling the alcohol from the revived ethanolamine, leaving a pure regenerated ethanolamine solution.

As stated before, aqueous ethanolamine solutions are purified and regenerated by the method of this invention. Thus it is applicable to the purification of monoethanolamine, diethanolamine, and triethanolamine. It is especially effective for monoethanolamine and diethanolamine, and particularly effective for the purification of the latter. Ethanolamine aqueous solutions employed as absorption reagents usually contain from 20 to 30 weight per cent, free uncombined ethanolamine. The purification process is applied whenever the combined ethanolamine content exceeds 20 weight per cent causing treating inactivity.

The spent ethanolamine solutions are treated with an alkaline earth metal hydroxide to precipitate alkaline earth organic salts and other impurities. The calcium, barium, and strontium hydroxide can be utilized in the process of this invention. Because of cost considerations the calcium compound is preferred. The lime may be added as a dry powder, or, if more convenient, as a concentrated aqueous slurry or even in dilute solutions. The slurry form is the most efficient. Temperatures of 180°–250° F. are employed in this treating step with reflux. Atmospheric pressure or higher can be utilized. An excess of alkaline earth metal hydroxide is desirably employed. Some precipitation takes place at this step.

Precipitation of alkaline earth metal organic salts is greatly facilitated in the presence of a water-soluble lower alcohol, i. e., $C_1$–$C_3$, since ethanolamine is soluble in these alcohols, while the alkaline earth organic salts are not. Thus the lower alcohols are most conveniently added simultaneously or subsequent to the calcium treating step; however, the latter is preferred. The water content of the lower alcohols is not critical, but, of course, the process is rendered more efficient by lower water contents. The choice will depend upon cost considerations. Conveniently 1 to 2 volumes of alcohol, preferably isopropanol, are employed per volume of aqueous ethanolamine to be treated.

The precipitated alkaline earth metal salts are then separated from the residual solution by filtration or other conventionally known separation means, centrifuging, etc. The addition of filter aid to the alcohol solution improves its filterability whether using a plate frame press or rotary type of filter. The purified ethanolamine is then recovered from the filtrate by distillation of the alcohol.

This invention will be better understood by reference to the flow diagram shown in the drawing.

The spent diethanolamine aqueous solution (one containing excessive combined diethanolamine) is fed through line 1 into treating tank 2 maintained at a temperature of around 200° F. An aqueous calcium hydroxide slurry is fed through line 3 into treating tank 2, which is thoroughly agitated with mixer 4. The treated mixture, i. e., a slurry of calcium hydroxide, precipitated calcium organic salts, and treated feed is withdrawn from tank 2 through line 7. A portion of this withdrawn mixture is recycled through line 6 and heater 5 back to treating tank 2, while the remaining portion of the material in line 7 is sent through line 8 to mixer 9; 99 volume per cent isopropanol is added through line 12 in order to further complete precipitation of the calcium organic salts. Filter aid is added through line 13 and the resulting slurry passed to mixer 11. The mixed slurry is withdrawn from mixer 11 through line 14 and sent to plate frame press filter 15. Filter cake is withdrawn through line 16 and the regenerated aqueous diethanolamine filtrate, along with the isopropanol, is sent through line 17 to still 18. The isopropanol is taken off overhead from still 18 through line 19 along with small quantities of water. Since aqueous diethanolamine is desired as an absorption reagent, it is unnecessary, and even undesirable, to remove much water from the solution. The purified and regenerated aqueous diethanolamine is withdrawn as a bottoms through line 20.

The improved method of this invention is illustrated by the following example.

EXAMPLE

A spent diethanolamine solution containing almost 50 weight per cent of its diethanolamine in the combined form was treated by the manner of this invention as detailed in the table presented below. The treatment according to this process resulted in a combined diethanolamine content of less than 3%, a significant improvement. The results and treating steps are summarized in the following table:

*Purification of diethanolamine*

Spent diethanolamine solutions:
  Free diethanolamine_____weight per cent__ 24.3
  Combined diethanolamine_____do____ 22.6
  Total diethanolamine_____do____ 46.9
  SSU viscosity at 100° F_____ 42.4

Purification operation:
  Calcium hydroxide used____wt. % (excess)__ 20
  Refluxed at 180°–250° F. for_____hours__ 2
  99 volume per cent isopropanol used alcohol to
    diethanolamine ratio_____ 2:1
  Per cent regeneration_____ 99.5

Purified diethanolamine diluted with water:
- Free diethanolamine _____ weight per cent __ 25.1
- Combined diethanolamine _____ do ____ 0.7
- Total diethanolamine _____ do ____ 25.8
- SSU viscosity at 100° F _____ 32

The advantages of the process of this invention are readily apparent to the skilled in the art in terms of efficiency and economy. Another advantage is that due to the insolubility of the alkaline earth metal organic salts in the alcohol solutions this permits their removal from aqueous diethanolamine solutions.

It is to be understood that the invention is not limited to the specific examples, which have been offered merely as illustrations, and that modifications may be made without departing from the spirit of this invention.

What is claimed is:

1. In a process for regenerating a treating solution consisting of water and a dissolved amine material of the group consisting of monoethanolamine and diethanolamine salts of an organic acid impurity in admixture with the corresponding free amine, said organic amine salts being present in a concentration corresponding to at least 12 weight percent of the amine based on the weight of the solution, the improvement which comprises mixing said treating solution with an alkaline earth metal hydroxide added in excess with respect to said organic amine salts, heating the mixture at a temperature of 180 to 250° F. to convert said amine salts into alkaline earth metal salts and free amine, adding 1 to 2 volumes of isopropanol per volume of said treating solution to precipitate said alkaline earth metal organic salts, separating the said precipitated metal organic salts from the residual solution to leave a filtrate consisting essentially of water, free amine and alcohol, and distilling the filtrate to remove the alcohol and leave a purified aqueous amine solution.

2. The process of claim 1 where the amine is diethanolamine.

3. The process of claim 2 wherein the alkaline earth metal hydroxide is calcium hydroxide.

References Cited in the file of this patent

UNITED STATES PATENTS

| | | |
|---|---|---|
| 1,989,004 | Fife | Jan. 22, 1935 |
| 2,311,342 | Kerns | Feb. 16, 1943 |

FOREIGN PATENTS

| | | |
|---|---|---|
| 443,314 | Great Britain | Feb. 26, 1936 |